US011272743B2

(12) United States Patent
Qiu

(10) Patent No.: US 11,272,743 B2
(45) Date of Patent: Mar. 15, 2022

(54) ATOMIZING DEVICE AND ELECTRONIC CIGARETTE THEREOF

(71) Applicant: CHANGZHOU JWEI INTELLIGENT TECHNOLOGY CO., LTD., Jiangsu (CN)

(72) Inventor: Weihua Qiu, Jiangsu (CN)

(73) Assignee: CHANGZHOU JWEI INTELLIGENT TECHNOLOGY CO., LTD., Changzhou (CN)

(*) Notice: Subject to any disclaimer, the term of this patent is extended or adjusted under 35 U.S.C. 154(b) by 661 days.

(21) Appl. No.: 16/181,083

(22) Filed: Nov. 5, 2018

(65) Prior Publication Data
US 2019/0075846 A1 Mar. 14, 2019

Related U.S. Application Data

(63) Continuation-in-part of application No. PCT/CN2017/081848, filed on Apr. 25, 2017.

(30) Foreign Application Priority Data

May 6, 2016 (CN) .......................... 201610295648.5

(51) Int. Cl.
*A24F 40/53* (2020.01)
*A24F 40/49* (2020.01)
(Continued)

(52) U.S. Cl.
CPC .............. *A24F 40/53* (2020.01); *A24F 40/49* (2020.01); *A24F 40/10* (2020.01); *H01M 50/213* (2021.01)

(58) Field of Classification Search
CPC ........... A24F 40/53; A24F 40/49; A24F 40/10
(Continued)

(56) References Cited

U.S. PATENT DOCUMENTS 6,453,795 B1 * 9/2002 Eicher ............... A61M 15/0065
92/23
7,621,273 B2 * 11/2009 Morton ............. A61M 15/0065
128/205.23
(Continued)

FOREIGN PATENT DOCUMENTS

CN 102727969 A 10/2012
CN 103179870 A 6/2013
(Continued)

*Primary Examiner* — Alexander Gilman
(74) *Attorney, Agent, or Firm* — Novick, Kim & Lee, PLLC; Allen Xue

(57) ABSTRACT

An electronic cigarette has an atomizing device and a battery device electrically connected to the atomizing device. The atomizing device has a connecting assembly connected to the battery device, a movable assembly rotatable about the connection assembly, and a locking mechanism disposed between the movable assembly and the connecting assembly, the locking mechanism is capable of releasing the locking between the movable assembly and the connecting assembly under external force, to make the movable assembly rotate circumferentially around the axis of the connecting assembly, to achieve alignment between the atomizing device and the battery device. When the locking mechanism is in the unlocked state, the user can align the atomizing device with the battery device by rotating the movable assembly so that the assembled electronic cigarette has a more pleasant appearance and more convenient to handle after the alignment.

16 Claims, 9 Drawing Sheets

(51) Int. Cl.
*H01M 50/213* (2021.01)
*A24F 40/10* (2020.01)

(58) Field of Classification Search
USPC .......................................................... 131/329
See application file for complete search history.

(56) References Cited

U.S. PATENT DOCUMENTS

| | | | | |
|---|---|---|---|---|
| 8,141,550 B2* | 3/2012 | Lawrence | ................ | G09F 11/04 |
| | | | | 128/200.17 |
| 9,339,615 B2* | 5/2016 | Smutney | ............... | A61K 9/0075 |
| 9,545,487 B2* | 1/2017 | Besseler | .............. | A61M 11/007 |
| 9,943,654 B2* | 4/2018 | Herrmann | ........... | B05B 11/3001 |
| 10,099,022 B2* | 10/2018 | Eicher | ................ | B05B 11/0054 |
| 10,124,125 B2* | 11/2018 | Bach | .................... | A61M 11/006 |
| 10,159,644 B2* | 12/2018 | Smutney | ................ | A61K 39/12 |
| 11,038,360 B2* | 6/2021 | Fornarelli | .............. | H05B 3/141 |
| 2002/0000225 A1* | 1/2002 | Schuler | ................. | A61M 15/00 |
| | | | | 128/200.14 |
| 2003/0042336 A1* | 3/2003 | Wuttke | .................. | A61M 11/06 |
| | | | | 239/569 |
| 2010/0313901 A1* | 12/2010 | Fernando | .............. | H02J 7/0042 |
| | | | | 131/330 |
| 2013/0312742 A1* | 11/2013 | Monsees | ................. | G06F 3/147 |
| | | | | 128/202.21 |
| 2014/0014125 A1* | 1/2014 | Fernando | .............. | H02J 7/0068 |
| | | | | 131/328 |
| 2014/0238423 A1* | 8/2014 | Tucker | .................... | A24F 40/44 |
| | | | | 131/328 |
| 2014/0238424 A1* | 8/2014 | Macko | .................... | A24F 40/46 |
| | | | | 131/328 |
| 2015/0224268 A1* | 8/2015 | Henry | .................... | G06Q 30/00 |
| | | | | 128/202.21 |
| 2015/0245665 A1* | 9/2015 | Memari | .................... | B65B 3/04 |
| | | | | 131/329 |
| 2015/0257445 A1* | 9/2015 | Henry, Jr. | ................ | A24F 40/53 |
| | | | | 131/328 |
| 2015/0257447 A1* | 9/2015 | Sullivan | ............ | A61M 15/0086 |
| | | | | 131/329 |
| 2015/0258289 A1* | 9/2015 | Henry, Jr. | ............. | A61M 15/06 |
| | | | | 128/202.21 |
| 2015/0272217 A1* | 10/2015 | Chen | ........................ | A24F 40/42 |
| | | | | 131/329 |
| 2015/0282527 A1* | 10/2015 | Henry, Jr. | ................ | A24F 40/51 |
| | | | | 131/328 |
| 2015/0335073 A1* | 11/2015 | Li | .......................... | A24F 40/44 |
| | | | | 131/329 |
| 2015/0335075 A1* | 11/2015 | Minskoff | ................ | A24F 40/44 |
| | | | | 131/329 |
| 2015/0342256 A1* | 12/2015 | Chen | ....................... | A24F 40/44 |
| | | | | 392/404 |
| 2016/0007651 A1* | 1/2016 | Ampolini | ................ | A24F 40/53 |
| | | | | 131/328 |
| 2018/0310628 A1* | 11/2018 | Qiu | ......................... | A24F 40/46 |
| 2019/0075846 A1* | 3/2019 | Qiu | ......................... | A24F 40/53 |
| 2019/0328044 A1* | 10/2019 | Qiu | ......................... | A24F 40/42 |
| 2019/0350263 A1* | 11/2019 | Qiu | ......................... | A24F 40/42 |

FOREIGN PATENT DOCUMENTS

| | | |
|---|---|---|
| CN | 103720055 A | 4/2014 |
| CN | 103908019 A | 7/2014 |
| CN | 204120224 U | 1/2015 |
| CN | 204292192 U | 4/2015 |
| CN | 105831811 A | 8/2016 |
| CN | 205728056 U | 11/2016 |
| WO | 2015175022 A1 | 11/2015 |

* cited by examiner

ATOMIZING DEVICE AND ELECTRONIC CIGARETTE THEREOF

CROSS-REFERENCE TO RELATED APPLICATIONS

This application is a continuation-in-part of International Patent Application No. PCT/CN2017/081848, filed on Apr. 25, 2017, entitled "Atomizing Device and Electronic Cigarette Carrying Same", which claims priority to Chinese Patent Application No. 201610295648.5, filed on May 6, 2016, entitled "Atomizing Device and Electronic Cigarette Thereof". All of the aforementioned patent applications are hereby incorporated by reference in their entireties.

FIELD OF TECHNOLOGY

The present disclosure relates to the field of simulated smoking technology, and more particularly to an atomizing device and electronic cigarette using the same.

BACKGROUND

At present, electronic cigarettes generally include an atomizing device and a battery device, the atomizing device and the battery device are detachably connected together by threads. However, the user's requirement for accurate alignment of the atomizing device and certain surface of the battery device cannot be met by the threaded connection, especially for non-cylindrical atomizing devices and non-cylindrical battery devices, failure to accurately align the position will make the assembled electronic cigarette not aesthetically pleasing and inconvenient to use.

SUMMARY

The present disclosure provides an atomizing device that can accurately align with the battery device.

It is also provides an electronic cigarette having the atomizing device.

An atomizing device, for an electronic cigarette comprising atomizing device and a battery device electrically connected to the atomizing device, includes a connecting assembly connected to the battery device, a movable assembly rotatable about the connection assembly, and a locking mechanism disposed between the movable assembly and the connecting assembly, the locking mechanism is capable of releasing the locking between the movable assembly and the connecting assembly under external force, to make the movable assembly rotate circumferentially around the axis of the connecting assembly, to achieve alignment between the atomizing device and the battery device.

In one embodiment, after the atomizing device is aligned with the battery device, the locking mechanism is configured to lock the movable assembly and the connecting assembly.

In one embodiment, the movable assembly comprises a reservoir, the connecting assembly comprises a positive electrode contact; the atomizer base is provided with a through hole, one end of the positive electrode contact is received in the through hole, and the other end of the positive electrode contact is detachably connected to the battery device, the locking mechanism is configured to lock or unlock the positive electrode contact base and the atomizer base.

In one embodiment, the atomizer base defines a positioning hole communicating with the through hole, the locking mechanism comprises a locking member and a locking groove, the locking member is movably disposed in the positioning hole along the positioning hole, the locking groove defined in the outer surface of the positive electrode contact base facing the positioning hole, the locking member is detachably locked in the locking groove.

In one embodiment, there are two positioning holes. The positioning holes pass through two opposite ends of the atomizer base in a direction perpendicular to the axial direction of the atomizer, the through hole is connected between the two positioning holes, the number of the locking member is two, the locking members are locking screws, which are respectively inserted into the corresponding positioning hole along the axial direction of the positioning hole and separable locked in the locking groove.

In one embodiment, the atomizer base defines a positioning hole communicating with the through hole, the locking mechanism comprises a sliding rod and a gear, the gear is sleeved on the outside of the positive electrode contact base, the sliding rod is slidably received in the positioning hole in the axial direction of the positioning hole and can be separately meshed with the gear.

In one embodiment, the atomizer base defines a positioning hole in communication with the through hole, the locking mechanism comprises a sliding rod and teeth, the teeth are disposed directly on the surface of the positive electrode contact base opposite to the positioning hole and engaged with the sliding rod.

In one embodiment, the locking mechanism further includes a toggle lever, one end of the toggle lever passes through the positioning hole in the axial direction of the positioning hole and is connected with the sliding rod, the other end of the toggle lever is exposed outside of the atomizing device.

In one embodiment, the locking mechanism further comprises an elastic member and a cover, the sliding rod includes a rod portion, a locking portion, and an abutting protrusion, the cover is embedded into one end of the positioning hole opposite to the through hole, one end of the toggle lever passes through the cover in the axial direction of the positioning hole and is fixedly connected with the rod portion, the locking portion is disposed at one end of the rod portion opposite to the toggle lever, and is detachably engaged with the gear by an external force, the abutting protrusion is disposed between the rod portion and the locking portion, the elastic member is sleeved on the outer circumference of the rod portion and abuts between the pressing cover and the abutting protrusion, to provide a restoring force to drive sliding rod slide toward the positive electrode contact base.

In one embodiment, the positive electrode contact base is provided with a card slot, and the latching teeth latched in the card slot are protruded on the inner wall surface of the gear.

In one embodiment, the movable assembly of the atomizing device and the battery device are respectively provided with an indicator mark, the indicator mark located on the movable assembly is rotated with the movable assembly relative to the battery device under the action of an external force, when two indicator marks are successfully aligned in right position, it indicates that the atomizing device and the battery device are successfully aligned; when the two indicator marks are misaligned, it indicates that the atomizing device and the battery device are misaligned.

An electronic cigarette, includes a battery device, and any one of the above-described atomizing device.

In one embodiment, the atomizing device further comprises an activation indicator, the activation indicator is disposed on the movable assembly and is rotatable relative to the battery device with the movable assembly under the action of an external force, he battery device comprise a detecting module, a control module, and a power module, the detecting module is disposed on the battery device, and only when the atomizing device and the battery device are accurately aligned, the detecting module is configured to detect the activation indicator and feed the information back to the control module as to whether the activation indicator is detected; the control module and the power module are disposed within the battery device, the control module is configured to control the circuit conduction between the atomizing device and the power module, when the detecting module detects the activation indicator, the circuit between the atomizing device and the power module is controlled to be disconnected; when the detecting module does not detect the activation indicator; the power module is configured to provide electrical energy to the atomizing device, when the circuit between the power module and the atomizing device is turned on.

The beneficial effects of the device are:

When the locking mechanism is in the unlocked state, the user can accurately align the atomizing device with the battery device by rotating the movable assembly, so that the assembled electronic cigarette has a more pleasant appearance, and it is more convenient for the non-cylindrical shaped atomizing device and the battery device to be used after alignment. In addition, the electrical connection between the atomizing device and the power module in the electronic cigarette requires the atomizing device and the battery device to be turned on, which provides a child proof function.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION OF PREFERRED EMBODIMENTS

Figure 1:
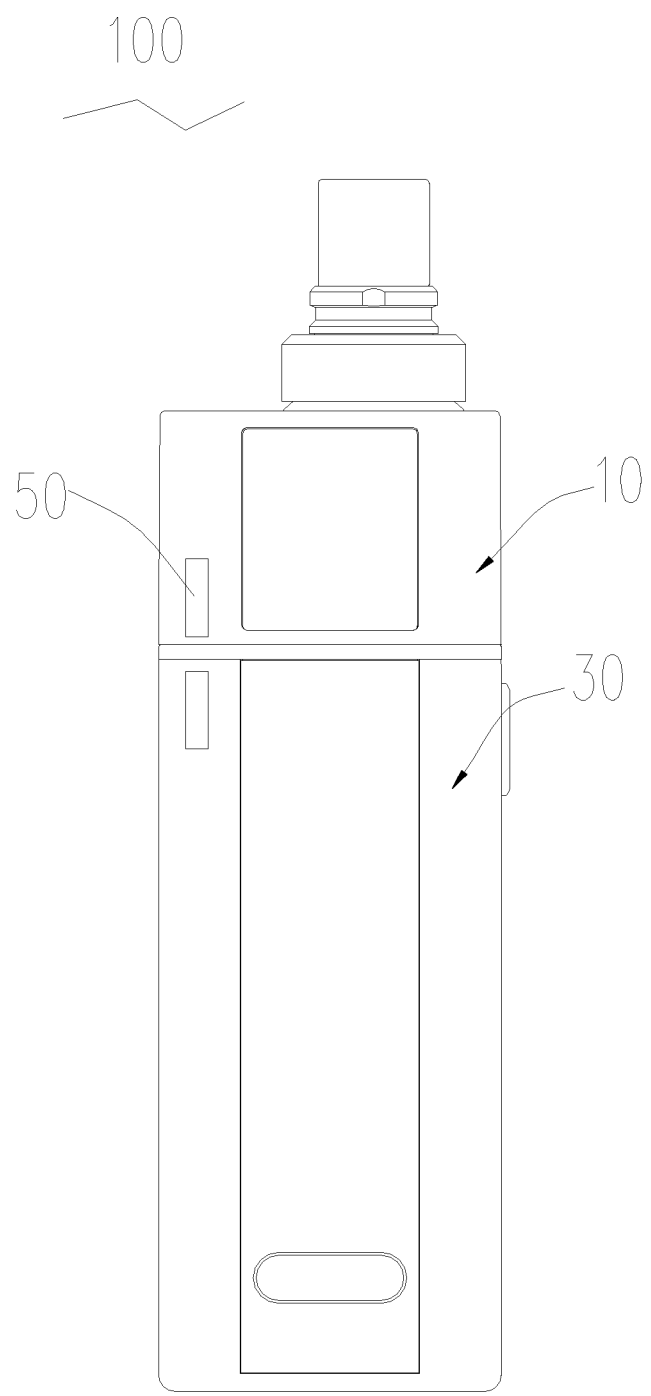
FIG. 1 is a perspective view of an electronic cigarette according to an embodiment of the present application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

When a feature or element is herein referred to as being "on" another feature or element, it can be directly on the other feature or element or intervening features and/or elements may also be present.

Terminology used herein is for the purpose of describing particular embodiments only and is not intended to be limiting of the disclosure. As used herein, the term "and/or" includes any and all combinations of one or more of the associated listed items and may be abbreviated as "/".

Referring to FIG. 1, an embodiment of the present disclosure discloses an electronic cigarette 100. The electronic cigarette 100 includes an atomizing device 10 and a battery device 30. The atomizing device 10 is configured for atomizing the cigarette liquid stored therein for the user to smoke. The battery device 30 is electrically connected to the atomizing device 10 for powering the atomizing device 10.

Figure 2:
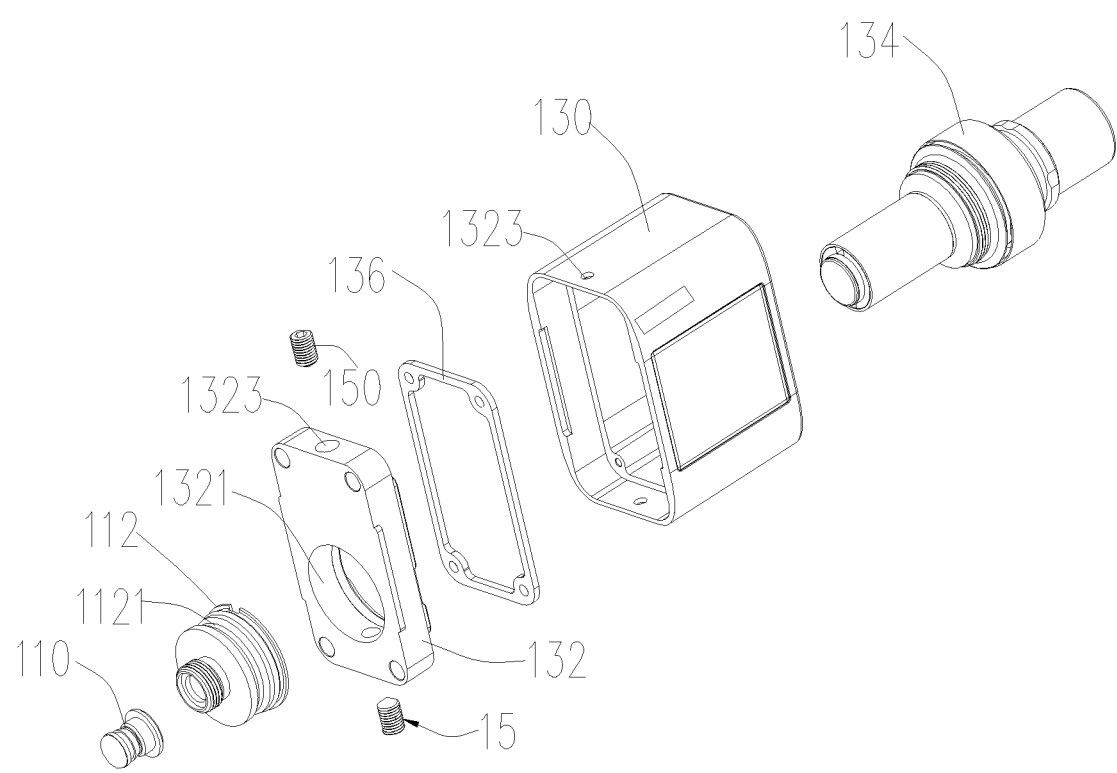
FIG. 2 is an exploded view of the atomizing device in the first embodiment of FIG. 1.
Figure 3:
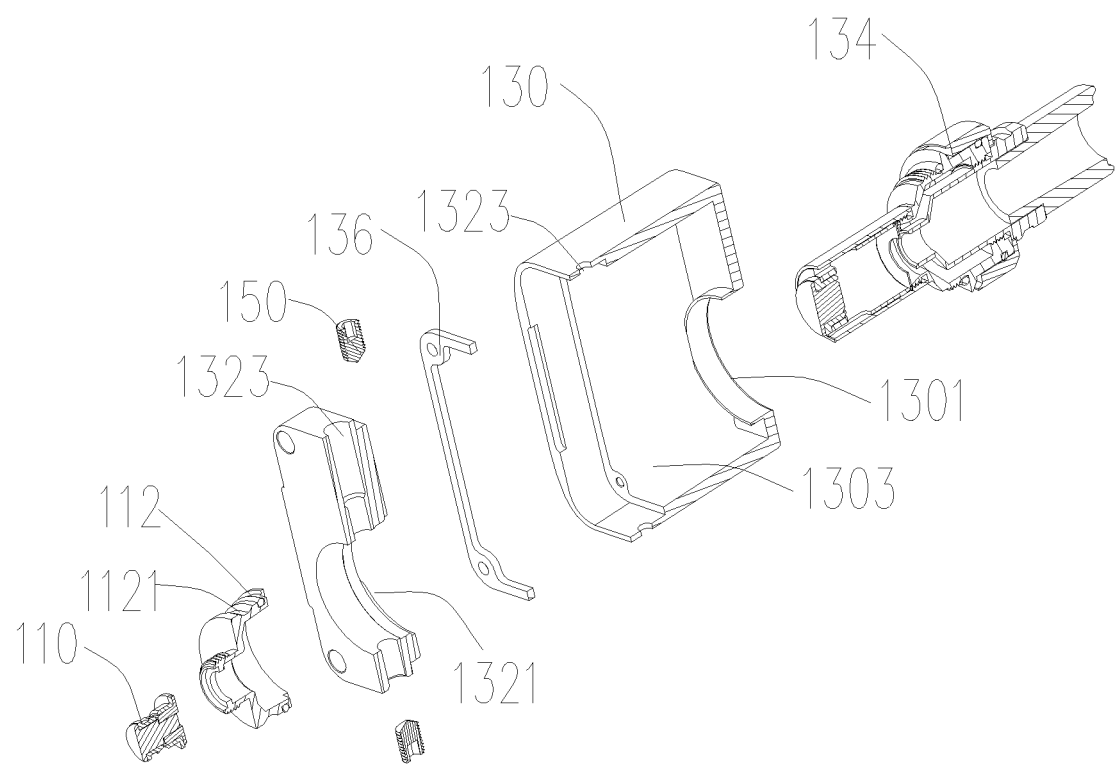
FIG. 3 is a cross-sectional view of the atomizing device of FIG. 2 taken along the axial direction.

Referring to FIG. 2 and FIG. 3, the atomizing device 10 includes a connecting assembly (not labeled), a movable assembly (not labeled), and a locking mechanism 15. The movable assembly can be rotated around the connection assembly. The connecting assembly is connected to the battery device 30, the locking mechanism 15 is disposed between the movable assembly and the connecting assembly, can release the locking between the movable assembly and the connecting assembly under external force, to make the movable assembly rotate circumferentially around the axis of the connecting assembly, thereby the atomizer device 10 is accurately aligned with the battery device 30. At the same time, after the atomizing device 10 is aligned with the battery device 30, the locking mechanism 15 is also used to lock the movable assembly and the connecting assembly, to prevent the atomizing device 10 and the battery device 30 from being misaligned and affecting the user's use.

In the embodiment, as shown in FIG. 3, the movable assembly includes a reservoir 130, an atomizer base 132, and an atomizer 134. The connecting assembly includes a positive electrode contact 110 and a positive electrode contact base 112. In an embodiment, the reservoir 130 is a hollow rectangular shape with an open bottom, the top end of the reservoir 130 is provided with a plug interface 1301. The atomizer base 132 blocks the bottom of the reservoir 130, so that a storage chamber 1303 for storing the cigarette liquid is formed in the reservoir 130. The atomizer base 132 is provided with a through hole 1321 penetrating in the axial direction of the atomizer 134. The through hole 1321 is in communication with the storage chamber 1303 and the plug interface 1301.

Specially, as shown in FIG. 3, both ends of the positive electrode contact base 112 are interconnected, one end of positive electrode contact base 112 is received in the through hole 1321 and communicated with the storage chamber 1303, the other end is detachably connected to the battery device 30 by means of a screw. The positive electrode contact assembly 110 is disposed in the positive electrode contact base 112 and is electrically connected to the battery device 30. One end of the atomizer 134 is detachably connected to the plug interface 1301 and extends along the axial direction of the plug interface 1301, and then passes through the reservoir 130 to be received in the positive electrode contact base 112 and electrically connected to the positive electrode contact assembly 110. The other end of the atomizer 134 is exposed outside of the plug interface 1301 for the user to smoke the smoke formed by the atomized cigarette liquid. The locking mechanism 15 is configured to lock or unlock the positive electrode contact base 112 and the atomizer base 132.

Specifically, as shown in FIG. 3, the atomizer base 132 defines a positioning hole 1323 communicating with the through hole 1321. A locking groove 1121 is defined on the outer surface of the positive electrode contact base 112 facing the positioning hole 1323. The locking mechanism 15 includes a locking member 150 movably disposed in the positioning hole 1323 along the positioning hole 1323 and the locking groove 1121. The locking member 150 is detachably locked in the locking groove 1121 to lock the connecting assembly and the movable assembly. When the atomizing device 10 needs to be aligned with the battery device 30, the locking member 150 is separated from the locking groove 1121; when the atomizing device 10 is successfully aligned with the battery device 30, the locking member 150 is inserted into the locking groove 1121 to lock the movable component and the connecting component. In the embodiment, the positioning holes 1323 are two, the positioning holes 1323 are pass through two opposite ends of the atomizer base 132 in a direction perpendicular to the axial direction of the atomizer 134. The through hole 1321 is connected between the two positioning holes 1323. The number of the locking member 150 is also two, the locking members 150 are locking screws, which are respectively inserted into the corresponding positioning hole 1323 along the axial direction of the positioning hole 1323 and separably locked in the corresponding locking groove 1121.

In addition, since the atomizer base 132 is completely received in the bottom of the reservoir 130, the positioning hole 1323 extends from the atomizer base 132 through the side wall of the corresponding side of the reservoir 130 and communicates with the outside for the operation tool to extend into and operate the locking screw.

It can be understood that, in other embodiments, the atomizer base 132 can be partially exposed outside the bottom of the reservoir 130. The positioning hole 1323 is disposed through the portion of the atomizer base 132 exposed to the reservoir 130 and in communication with the outside, thus the operation tool can directly extend into the positioning hole 1323 of the atomizer base 132 to operate the locking screw. In addition, the number of the positioning holes 1323 can also be one or more, which can be disposed on one side of the atomizer base 132 or disposed on the circumferential side of the atomizer base 132, and is not limited herein.

Figure 4:
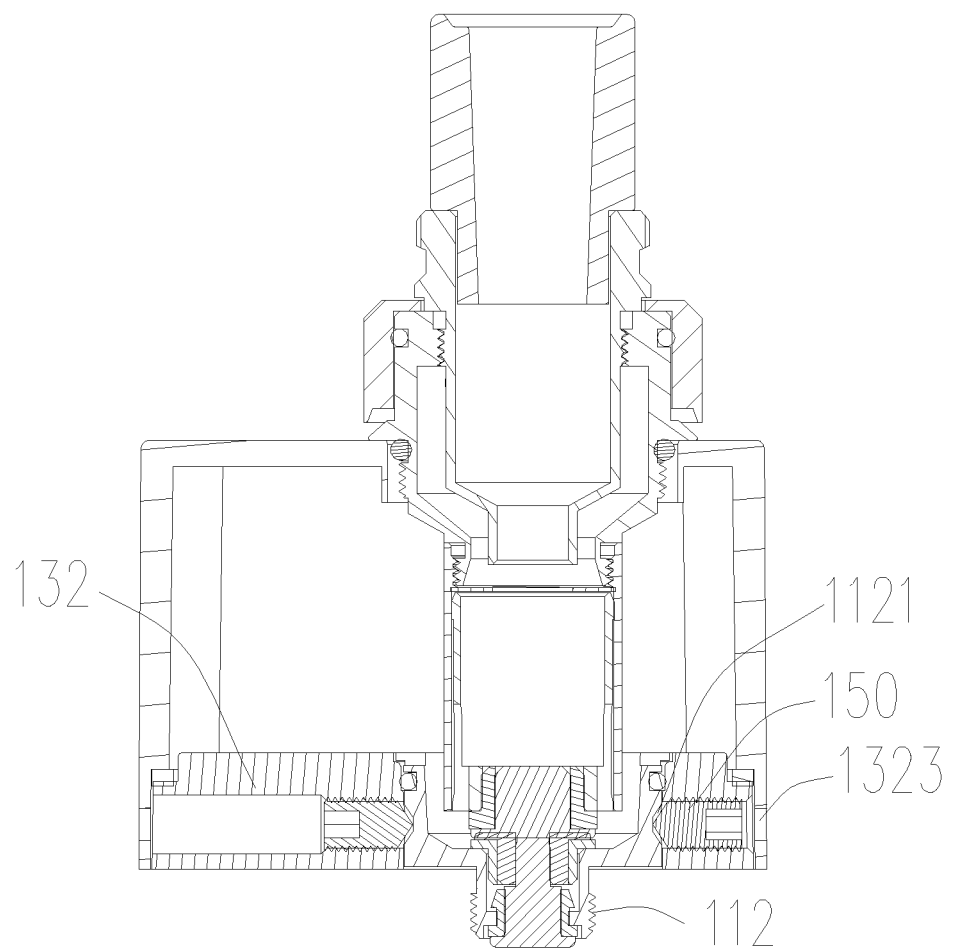
FIG. 4 is an assembled view of the atomizing device of FIG. 3.

Referring to FIG. 4, in use, when the positive electrode contact base 112 is connected to the battery device 30 by threads, inserting the operating tool into the positioning hole 1323 to loosen the locking member 150, the locking member 150 moves away from the locking groove 1121, and then the atomizer base 132 can be rotated relative to the positive electrode contact base 112, thereby the atomizing device 10 and the battery device 30 can be aligned. After the atomizing device 10 is successfully aligned with the battery device 30, the tool is operated again to tighten the locking member 150 to fix the atomizer base 132 relative to the positive electrode contact base 112.

Further, referring again to FIG. 2, the movable assembly of the atomizing device 10 further includes a sealing ring 136 disposed between the atomizer base 132 and the bottom of the reservoir 130 for preventing leakage of cigarette liquid.

Figure 5:
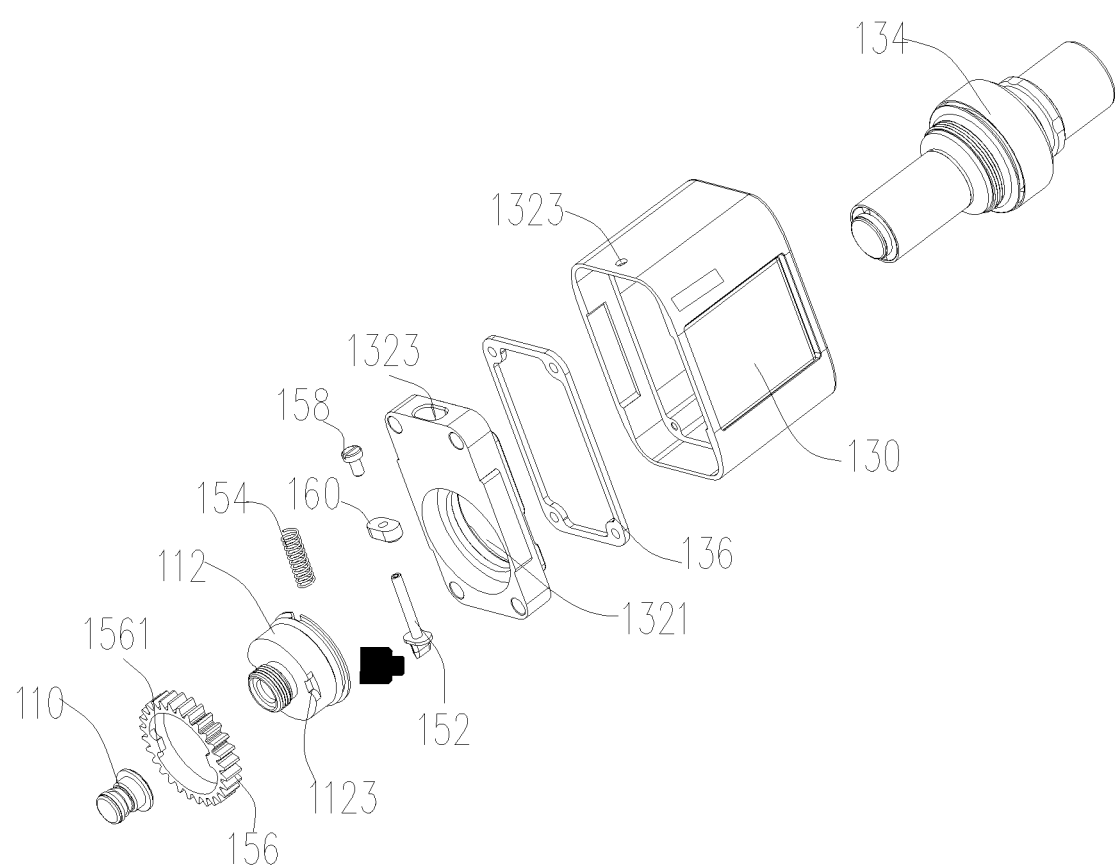
FIG. 5 is an exploded view of the atomizing device in the second embodiment.
Figure 6:
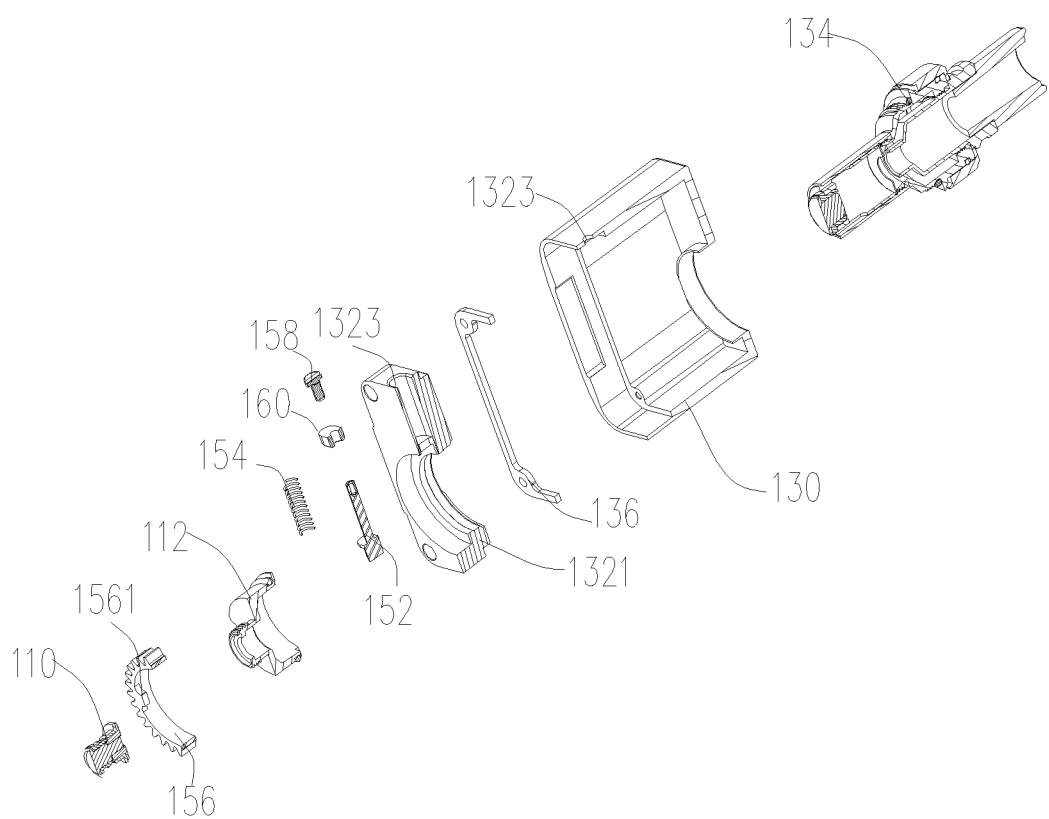
FIG. 6 is a cross-sectional view taken along the axial direction of the atomizing device of FIG. 5.

Referring to FIGS. 5 and 6, in another embodiment, the locking mechanism 15 includes a sliding rod 152 and a gear 156. The gear 156 is sleeved on the outside of the positive electrode contact base 112. The sliding rod 152 is slidably received in the positioning hole 1323 in the axial direction of the positioning hole 1323 and can be separately meshed with the gear 156.

Figure 7:
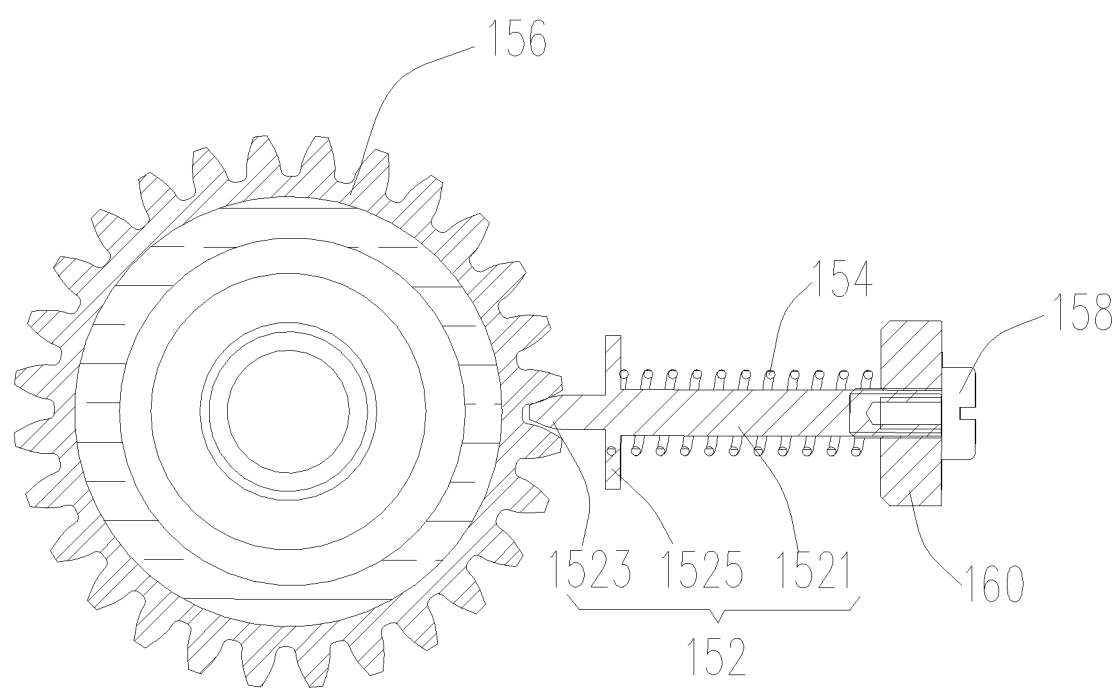
FIG. 7 is a schematic view showing the cooperation of the locking mechanism in the atomizing device shown in FIG. 5.

Referring to FIG. 7, specifically, the locking mechanism 15 further includes a toggle lever 158. One end of the toggle lever 158 passes through the positioning hole 1323 in the axial direction of the positioning hole 1323 and is connected with the sliding rod 152. The other end of the toggle lever 158 is exposed outside of the atomizing device 10 for the user to apply force to drive the sliding rod 152 to slide by pulling the toggle lever 158. In this embodiment, the other end of the toggle lever 158 is exposed outside of the reservoir 130.

Further, the locking mechanism 15 further includes an elastic member 154 and a cover 160. The sliding rod 152 includes a rod portion 1521, a locking portion 1523, and an abutting protrusion 1525. The cover 160 is embedded into one end of the positioning hole 1323 opposite to the through hole 1321. One end of the toggle lever 158 passes through the cover 160 in the axial direction of the positioning hole 1323 and is fixedly connected with the rod portion 1521. The user can apply a force on the other end of the toggle lever 158 to drive the rod portion 1521 to slide relative to the cover 160 in the axial direction of the positioning hole 1323. The locking portion 1523 is disposed at one end of the rod portion 1521 opposite to the toggle lever 158, and detachably engaged with the gear 156 by an external force. The abutting protrusion 1525 is disposed between the rod portion 1521 and the locking portion 1523. The elastic member 154 is sleeved on the outer circumference of the rod portion 1521 and abuts between the pressing cover 160 and the abutting protrusion 1525, to provide a restoring force to drive sliding rod 152 toward the positive electrode contact base 112.

Further, as shown in FIG. 5, in order to better fix the gear 156 to the positive electrode contact base 112, the positive electrode contact base 112 is provided with a card slot 1123, and the latching teeth 1561 latched in the card slot 1123 are protruded on the inner wall surface of the gear 156.

In other embodiments, the teeth (not shown) are disposed directly on the surface of the positive electrode contact base 112 opposite to the positioning hole 1323 and are engaged with the sliding rod 152, which is not limited herein.

Figure 8:
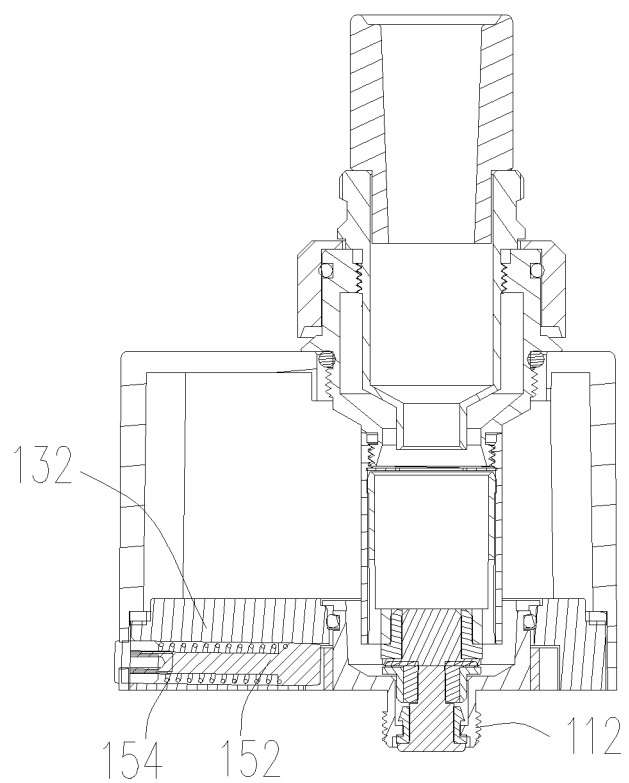
FIG. 8 is a assembled view of the atomizing device of FIG. 6.

Referring to FIG. 8, in use, when the positive electrode contact base 112 is connected to the battery device 30 by threads, pulling the toggle lever 158 exposed at one end of the reservoir 130 to drive the sliding rod 152 to move away from the gear 156, then the elastic member 154 is compressed; at this time, the locking portion 1523 is separated from the teeth on the gear 156, so that the atomizer base 132 can be rotated relative to the positive electrode contact base 112 to achieve alignment between the atomizing device 10 and the battery device 30. When the atomizing device 10 is successfully aligned with the battery device 30, the toggle lever 158 is released, and the sliding rod 152 is latched into the teeth of the gear 156 driven by the elastic member 154, so that the atomizer base 132 is fixed relative to the positive electrode contact base 112.

In the embodiment, the atomizing device 10 and the battery device 30 are both having a rectangular shape, and the entire electronic cigarette 100 has a rectangular shape. It is to be understood that, in other embodiments, the shape of the atomizing device 10 and the battery device 30 may also be a cylindrical or other non-cylindrical structure, which is not limited herein.

Referring again to FIG. 1, further, the movable assembly of the atomizing device 10 and the battery device 30 are respectively provided with an indicator mark 50. The indicator mark 50 located on the movable assembly can be rotated with the movable assembly relative to the battery device 30 under the action of an external force, and the alignment state of the two indicator marks 50 is used to indicate the alignment state of the atomizing device 10 and the battery device 30. When two indicator marks 50 are successfully aligned in right position, it indicates that the atomizing device 10 and the battery device 30 are successfully aligned; when the two indicator marks 50 are misaligned, it indicates that the atomizing device 10 and the battery device 30 are misaligned. In the embodiment, the indicator marks 50 are respectively disposed on the outer surface of the reservoir 130 and the outer surface of the battery device 30.

Figure 9:
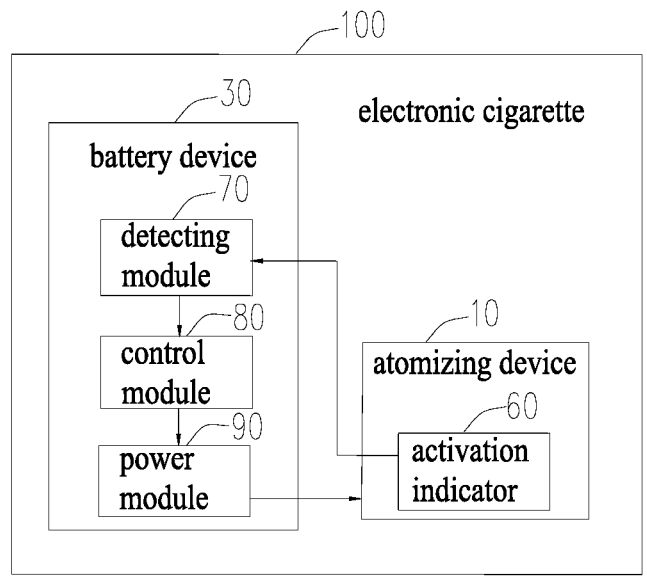
FIG. 9 is a circuit block diagram of the electronic cigarette of FIG. 1.
Figure 10:
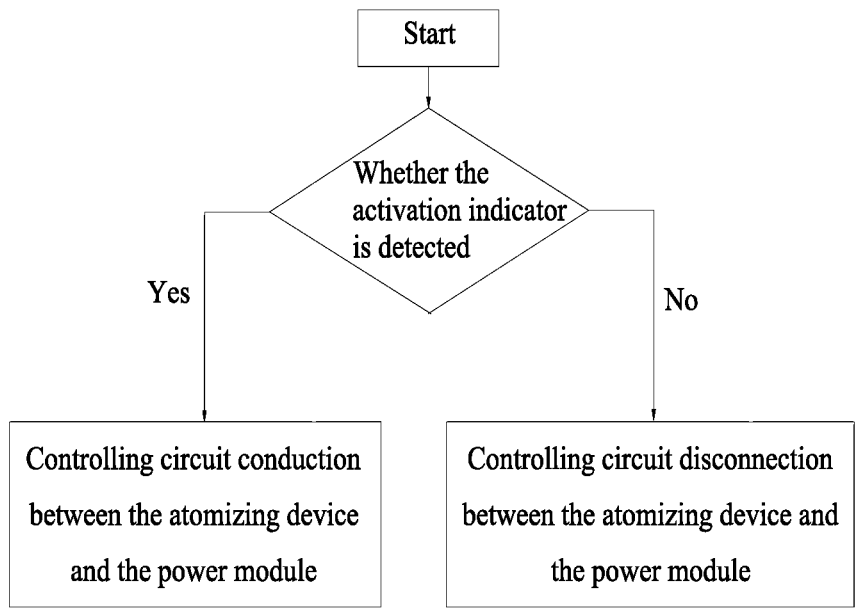
FIG. 10 is a flow diagram of the electronic cigarette of FIG. 9.

Further, referring to FIG. 9 and FIG. 10, the electronic cigarette 100 further includes a detecting module 70, a control module 80, and a power module 90. The atomizing device 10 also includes an activation indicator 60. The activation indicator 60 is disposed on the movable assembly and is rotatable relative to the battery device 30 with the movable assembly under the action of an external force. The detecting module 70 is disposed on the battery device 30, and only when the atomizing device 10 and the battery device 30 are accurately aligned, the detecting module 70 can detect the activation indicator 60 and feed information back to the control module 80 as to whether the activation indicator 60 is detected. Both the control module 80 and the power module 90 are disposed within the battery device 30.

The control module 80 is configured to control the circuit conduction between the battery device 30 and the power module 90, when the detecting module 70 detects the activation indicator 60. The circuit between the atomizing device 10 and the power module 90 is controlled to be disconnected, when the detecting module 70 does not detect the activation indicator 60.

The power module 90 is configured to provide electrical energy to the atomizing device 10, when the circuit between the power module 90 and the atomizing device 10 is turned on.

Children can only accomplish simple operations and would have difficulties to expect that, after the atomizing device 10 is connected to the battery device 30 through the connecting component, the electronic cigarette requires an alignment between the atomizing device 10 and the battery device 30 to operate. Therefore, the electronic cigarette 100 has a child proof function.

In the present disclosures, when the locking mechanism 15 is in the unlocked state, the user can accurately align the atomizing device 10 with the battery device 30 by rotating the movable assembly, so that the assembled electronic cigarette 100 has a more pleasant appearance, and it is more convenient for the non-cylindrical shaped atomizing device 10 and the battery device 30 to be used after alignment. In addition, the electrical connection between the atomizing device 10 and the power module 90 in the electronic cigarette 100 requires the atomizing device 10 and the battery device 30 to be turned on, which provides a child proof function.

The above-mentioned embodiments merely represent several implementations of the present application, and the descriptions thereof are more specific and detailed, but they shall not be understood as a limitation on the scope of the present application. It should be noted that, for those of ordinary skill in the art, variations and improvements may still be made without departing from the concept of the present application, and all of which shall fall into the protection scope of the present application. Therefore, the scope of protection of the present application shall be subject to the appended claims.

What is claimed is:

1. An atomizing device for an electronic cigarette, comprising:
   a connecting assembly connected to the battery device,
   a movable assembly rotatable about the connection assembly, and
   a locking mechanism disposed between the movable assembly and the connecting assembly,
      wherein the movable assembly comprises an atomizer connected to an atomizer base, and a housing connected to the atomizer and the atomizer base to form a reservoir,
      wherein the connecting assembly comprises a positive electrode contact and a positive electrode contact base,
      wherein the atomizer base is provided with a through hole, and a first end of the positive electrode contact is received in the through hole, and a second end of the positive electrode contact is detachably connected to the battery device,
      wherein the atomizer base defines a positioning hole in communication with the through hole, the locking mechanism comprises a locking member and a locking groove defined in an outer surface of the positive electrode contact base facing the positioning hole, the locking member is movably disposed in the positioning hole, and
      wherein the locking mechanism connects the movable assembly and the connecting assembly when the locking member is inserted in the locking groove, and disconnects the movable assembly and the connecting assembly when the lock member detaches from the locking groove.

2. The atomizing device according to the claim 1, wherein the atomizer base comprises two positioning holes disposed in a direction perpendicular to an axial direction of the atomizer and is in communication with the through hole, each positioning hole receives a locking member that is a locking screw.

3. The atomizing device according to the claim 1, wherein the movable assembly of the atomizing device is provided with a first indicator mark and the battery device is provided with a second indicator mark, the first indicator mark is disposed on the movable assembly and is rotated with the movable assembly relative to the battery device under the action of an external force, wherein alignment between the first and the second indicator marks indicates that the atomizing device and the battery device are in alignment.

4. An atomizing device for an electronic cigarette, comprising:
a connecting assembly connected to the battery device,
a movable assembly rotatable about the connection assembly, and
a locking mechanism disposed between the movable assembly and the connecting assembly,
wherein the movable assembly comprises an atomizer connected to an atomizer base, and a housing connected to the atomizer and the atomizer base to form a reservoir,
wherein the connecting assembly comprises a positive electrode contact and a positive electrode contact base,
wherein the atomizer base is provided with a through hole, and a first end of the positive electrode contact is received in the through hole, and a second end of the positive electrode contact is detachably connected to the battery device,
wherein the atomizer base defines a positioning hole in communication with the through hole, the locking mechanism comprises a sliding rod and a gear sleeving over an outer circumference of the positive electrode contact base, the sliding rod is slidably received in the positioning hole in the axial direction of the positioning hole and can be separately meshed with the gear and
wherein the locking mechanism connects the movable assembly and the connecting assembly when the sliding rod engages the gear, and disconnects the movable assembly and the connecting assembly when the sliding rod detaches from the gear.

5. The atomizing device according to the claim 4, wherein the locking mechanism further includes a toggle lever, a first end of the toggle lever passes through the positioning hole in the axial direction of the positioning hole and is connected with the sliding rod, a second end of the toggle lever is exposed outside of the atomizing device.

6. The atomizing device according to the claim 5, wherein the locking mechanism further comprises an elastic member and a cover, the sliding rod includes a rod portion, a locking portion, and an abutting protrusion, the cover is embedded into one end of the positioning hole opposite to the through hole, the first end of the toggle lever passes through the cover in the axial direction of the positioning hole and is fixedly connected with the rod portion, the locking portion is disposed at one end of the rod portion opposite to the toggle lever, and is detachably engaged with the gear by an external force, the abutting protrusion is disposed between the rod portion and the locking portion, the elastic member is sleeved on the outer circumference of the rod portion and abuts between the cover and the abutting protrusion to provide a restoring force that pushes the sliding rod toward the positive electrode contact base.

7. The atomizing device according to the claim 4, wherein the positive electrode contact base is provided with one or more card slots, which correspond to one or more latching teeth protruded from an inner wall surface of the gear.

8. An atomizing device for an electronic cigarette, comprising:
a connecting assembly connected to the battery device,
a movable assembly rotatable about the connection assembly, and
a locking mechanism disposed between the movable assembly and the connecting assembly,
wherein the movable assembly comprises an atomizer connected to an atomizer base, and a housing connected to the atomizer and the atomizer base to form a reservoir,
wherein the connecting assembly comprises a positive electrode contact and a positive electrode contact base,
wherein the atomizer base is provided with a through hole, and a first end of the positive electrode contact is received in the through hole, and a second end of the positive electrode contact is detachably connected to the battery device,
wherein the atomizer base defines a positioning hole in communication with the through hole, the locking mechanism comprises a sliding rod and teeth, the teeth are disposed directly on the surface of the positive electrode contact base opposite to the positioning hole, and
wherein the locking mechanism connects the movable assembly and the connecting assembly when the sliding rod engages the teeth, and disconnects the movable assembly and the connecting assembly when the sliding rod disengages from the teeth.

9. The atomizing device according to the claim 8, wherein the locking mechanism further includes a toggle lever, a first end of the toggle lever passes through the positioning hole in the axial direction of the positioning hole and is connected with the sliding rod, a second end of the toggle lever is exposed outside of the atomizing device.

10. The atomizing device according to the claim 9, wherein the locking mechanism further comprises an elastic member and a cover, the sliding rod includes a rod portion, a locking portion, and an abutting protrusion, the cover is embedded into one end of the positioning hole opposite to the through hole, the first end of the toggle lever passes through the cover in the axial direction of the positioning hole and is fixedly connected with the rod portion, the locking portion is disposed at one end of the rod portion opposite to the toggle lever, and is detachably engaged with the gear by an external force, the abutting protrusion is disposed between the rod portion and the locking portion, the elastic member is sleeved on the outer circumference of the rod portion and abuts between the cover and the abutting protrusion to provide a restoring force that pushes the sliding rod toward the positive electrode contact base.

11. The atomizing device according to the claim 8, wherein the positive electrode contact base is provided with one or more card slots, which correspond to one or more latching teeth protruded from an inner wall surface of the gear.

12. An electronic cigarette, comprising:
a battery device, and
the atomizing device comprises a connecting assembly connected to the battery device, a movable assembly rotatable about the connection assembly, and a locking mechanism disposed between the movable assembly and the connecting assembly, the locking mechanism is capable of releasing the locking between the movable assembly and the connecting assembly under external force, to make the movable assembly rotate circumferentially around the axis of the connecting assembly, to achieve alignment between the atomizing device and the battery device, and wherein the atomizing device further comprises an activation indicator, the activation indicator is disposed on the movable assembly and is rotatable relative to the battery device with the movable assembly under the action of an external force, the battery device comprises a detecting module, a control module, and a power module, the detecting module is disposed on the battery device, and only when the atomizing device and the battery device are accurately aligned, the detecting module is configured to detect the activation indicator and feedback information to the control module as to whether the activation indicator is detected;

the control module and the power module are disposed within the battery device, the control module is configured to control the circuit conduction between the atomizing device and the power module, when the detecting module detects the activation indicator, the circuit between the atomizing device and the power module is controlled to be disconnected; when the detecting module does not detect the activation indicator; the power module is configured to provide electrical energy to the atomizing device, when the circuit between the power module and the atomizing device is turned on.

13. The electronic cigarette, according to the claim 12, wherein the locking mechanism is configured to lock the movable assembly and the connecting assembly when the atomizing device is aligned with the battery device.

14. The electronic cigarette, according to the claim 13, wherein the movable assembly comprises an atomizer connected to an atomizer base, and a housing connected to the atomizer and the atomizer base to form a reservoir, the connecting assembly comprises a positive electrode contact and a positive electrode contact base; wherein the atomizer base is provided with a through hole, a first end of the positive electrode contact is received in the through hole, and a second end of the positive electrode contact is detachably connected to the battery device, the locking mechanism is configured to lock or unlock the positive electrode contact base and the atomizer base.

15. The electronic cigarette, according to the claim 14, wherein the atomizer base defines a positioning hole in communication with the through hole, the locking mechanism comprises a locking member and a locking groove, the locking member is movably disposed in the positioning hole, the locking groove is defined in an outer surface of the positive electrode contact base facing the positioning hole, the locking member is detachably locked in the locking groove.

16. The electronic cigarette, according to the claim 15, wherein the atomizer base comprises two positioning holes disposed in a direction perpendicular to an axial direction of the atomizer and is in communication with the through hole, each positioning hole receives a locking member that is a locking screw.

* * * * *